(12) United States Patent
Ogata et al.

(10) Patent No.: US 6,452,786 B1
(45) Date of Patent: Sep. 17, 2002

(54) PORTABLE ELECTRONIC DEVICE, AN OPERATION PANEL THEREOF, AND OPERATION METHOD OF THE PORTABLE ELECTRONIC DEVICE

(75) Inventors: Hiroki Ogata; Kazusato Tagawa, both of Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/525,584

(22) Filed: Mar. 15, 2000

(30) Foreign Application Priority Data

Mar. 18, 1999 (JP) ............................................. 11-073970

(51) Int. Cl.⁷ .............................. G06F 1/16; G06C 5/02
(52) U.S. Cl. ........................ 361/625; 200/5 A; 235/1 D; 361/683
(58) Field of Search ...................... 312/223.2; 235/1 D, 235/146; 200/5 R, 5 E, 5 A, 18, 50.1, 61.1, 61.7; 361/608, 610, 625, 627, 631, 632, 647, 657, 680, 681, 683, 686, 724–727; 16/277

(56) References Cited

U.S. PATENT DOCUMENTS 4,084,214 A * 4/1978 Eppich
4,703,160 A 10/1987 Narishima et al.
4,890,832 A 1/1990 Komaki
5,510,953 A * 4/1996 Merkel
5,646,649 A 7/1997 Iwata et al.
5,738,536 A * 4/1998 Ohgami
5,785,317 A 7/1998 Sasaki
5,905,632 A * 5/1999 Seto
6,191,938 B1 * 2/2001 Ohgami et al. ............. 361/681

FOREIGN PATENT DOCUMENTS

JP         11-231970           8/1999

* cited by examiner

Primary Examiner—Gerald Tolin
(74) Attorney, Agent, or Firm—Rosenman & Colin LLP

(57) ABSTRACT

A portable electronic device includes a main unit which has operation switches, and an operation panel which has operation buttons that press the operation switches and which is rotatably mounted on the main unit. The operation panel can be freely attached to and detached from the main unit and can be replaced with another operation panel if needed. The ability to replace the operation panel makes it possible to have multiple types of operation panels available and to select operation panels whose operation buttons are different and mount them on the main unit.

7 Claims, 23 Drawing Sheets

PORTABLE ELECTRONIC DEVICE, AN OPERATION PANEL THEREOF, AND OPERATION METHOD OF THE PORTABLE ELECTRONIC DEVICE

BACKGROUND OF THE INVENTION

1. Field of the Invention

The present invention relates to a portable electronic device to be used as a ancillary machine of a video game device or other entertainment system or as a portable small game machine etc., an operation panel of that device, and an operation method for that device.

2. Background of the Invention

A conventional video game device is made with a detachable memory card device. With a video game device of this type, data stored in the video game device is stored in the memory card device, and data can be read from the video card device and transferred to the video game device as needed.

FIG. 1A is a block diagram showing the main part of a memory card device that can be attached to and detached from such a conventional video game device.

Memory card 10 has a control means 11 for controlling its operation, a connector 12 for connecting to a terminal provided in a slot of the video game device, and a nonvolatile memory 16 for storing data. Connector 12 and nonvolatile memory 16 are connected to control means 11.

Control means 11 is constructed using, for example, a microprocessor (labeled as such in the diagram). For nonvolatile memory 16, an EEPROM or other flash memory may be used.

FIG. 1B shows the control items of control means 11 of said memory card device 10. As shown in FIG. 1B, a conventional memory card device 10 has had only a main unit connection interface 11*a* for connecting to the main unit of the video game device, and a memory interface 11*b* for inputting and outputting data to and from a nonvolatile memory.

Memory card devices of the same type are constructed so as to be attachable to and detachable from information devices other than video game devices.

FIG. 2 is a plan view showing an example of the configuration of a conventional video game device to and from which a memory card device can be attached and detached.

In a conventional video game device 1, a main unit 2 is housed in a roughly square-shaped housing and has a disk loading unit 3 in its middle. Loaded on the disk loading unit 3 is an optical disk as a recording medium on which are recorded application programs for video games. Also provided on main unit 2 are a reset switch 4 for arbitrarily resetting the game, a power switch 5, a disk operation switch 6 to be used for loading and unloading an optical disk on and from disk loading unit 3, and, for example, two slots 7A and 7B.

Memory card device 10 is inserted into at least one or the other of slots 7A and 7B, and data, for example, the results of games executed on video game device 1, is written into nonvolatile memory 16.

Moreover, multiple controllers not pictured can be connected to said slots 7A and 7B, allowing multiple users to play a competitive game simultaneously.

Recently, thought has been given to portable electronic devices to be used as ancillary machines for video game devices and other information devices. Like the above-described memory card device 10, this new portable electronic device is used by being inserted into slot 7A or 7B of video game device 1 (the host machine), and the necessary data is downloaded to it. After the data is downloaded, it can be detached from the video game device and used as a portable small-size game machine, etc.

Such a new portable electronic device has operation switches on the device main unit and an operation panel that covers these operation switches. Operation buttons for operating the operation switches by pressing are mounted on the operation panel, and the user enjoys games by pressing these operation buttons.

In a portable electronic device having such a structure, it is desirable from the standpoint of operability that the mode of the operation buttons correspond to the content of their operations.

However, if for example the operation content of the operation switches varies depending on the program that is downloaded from the host machine, it is difficult, with a specified operation panel of a single type, to cause the mode of the operation buttons to correspond to the content of each operation.

And if operation panels having operation buttons of different sizes and heights, etc. or operation panels having a different color or feel, etc. can be arbitrarily selected according to the user's tastes, the degree of satisfaction by the user will increase, and further demand can be stimulated.

SUMMARY OF THE INVENTION

It is an object of this invention, which was devised in consideration of these circumstances, to satisfy user tastes and improve operability by allowing the operation panel to be selected arbitrarily.

In order to attain the above and other objects of the present, a portable electronic device of the present invention includes a main unit having operation switches, and an operation panel that is mounted rotatably on the main unit and has operation buttons by which one presses operation switches. The operation panel is freely detachable from the main unit and replaceable with another separate operation panel.

Because operation panels can thus be replaced, it is possible to have multiple types of operation panels, and one can select operation panels that differ in the shape of their operation buttons and other features, and mount them on the main unit.

This invention can also be embodied by an operation panel. That is, the operation panel of this invention, which is an operation panel that is rotatably mounted on the main unit in a portable electronic device, has operation buttons by which one presses operation switches, and is constructed to be detachable from the device main unit and replaceable. Here, operability can be improved if the operation buttons are formed in shapes to fit their mode of use.

Also, the method of operating the portable electronic device according to the present invention is a method of operation of a portable electronic device that has a main unit having operation switches and an operation panel that is mounted rotatably on and detachably from the main unit and has operation buttons by which one presses the operation switches, comprising the steps of selecting arbitrarily multiple types of operation panels whose operation buttons are of different shapes, mounting them on the main unit, and pressing the operation switches of the main unit via the operation buttons of a selected operation panel.

DETAILED DESCRIPTION OF THE PREFERRED EMBODIMENTS

An embodiment according to the present invention will hereinafter be described with reference to the accompanying drawings.

The portable electronic device according to an embodiment of the present invention can be used as a ancillary machine of an entertainment system, such as a video game device, that serves as the host machine. The portable electronic device can be used as a memory card device of the host machine, and can also be used by itself as a portable small-size game machine.

The host machine is not limited to a video game machine, and the portable electronic device that is the ancillary machine need not necessarily have a memory card function.

In the following description, a video game device as the host machine will be first described.

Figure 1B:
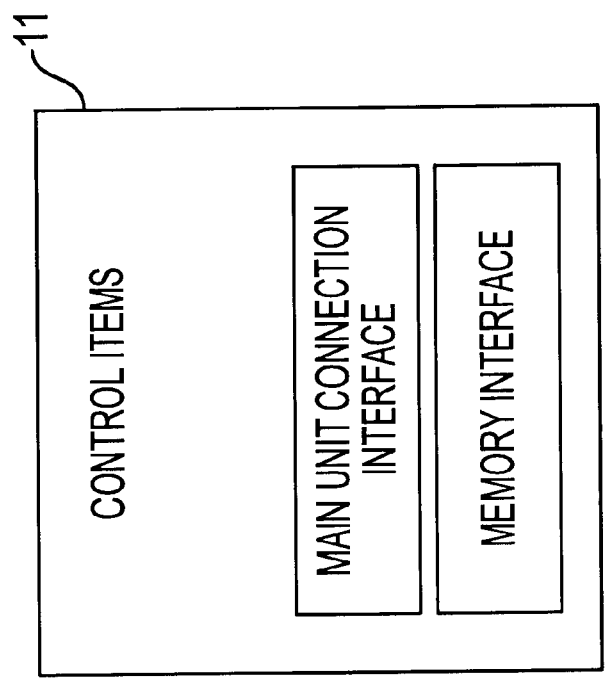
FIGS. 1A and 1B show an example of a conventional memory card device.
Figure 1A:
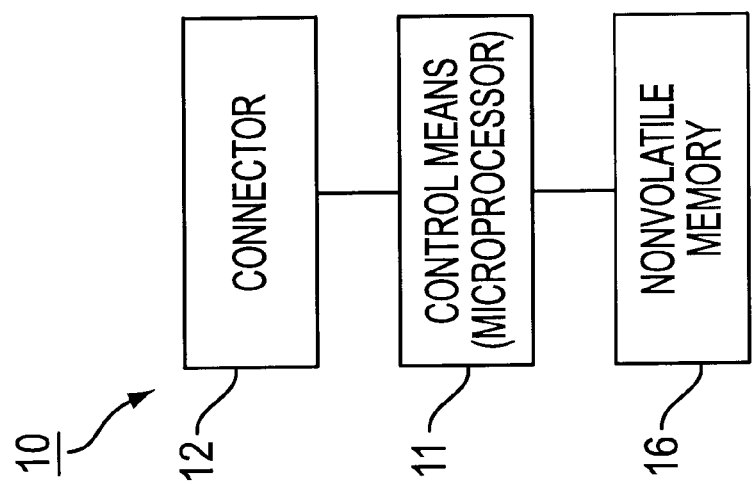
Figure 2:
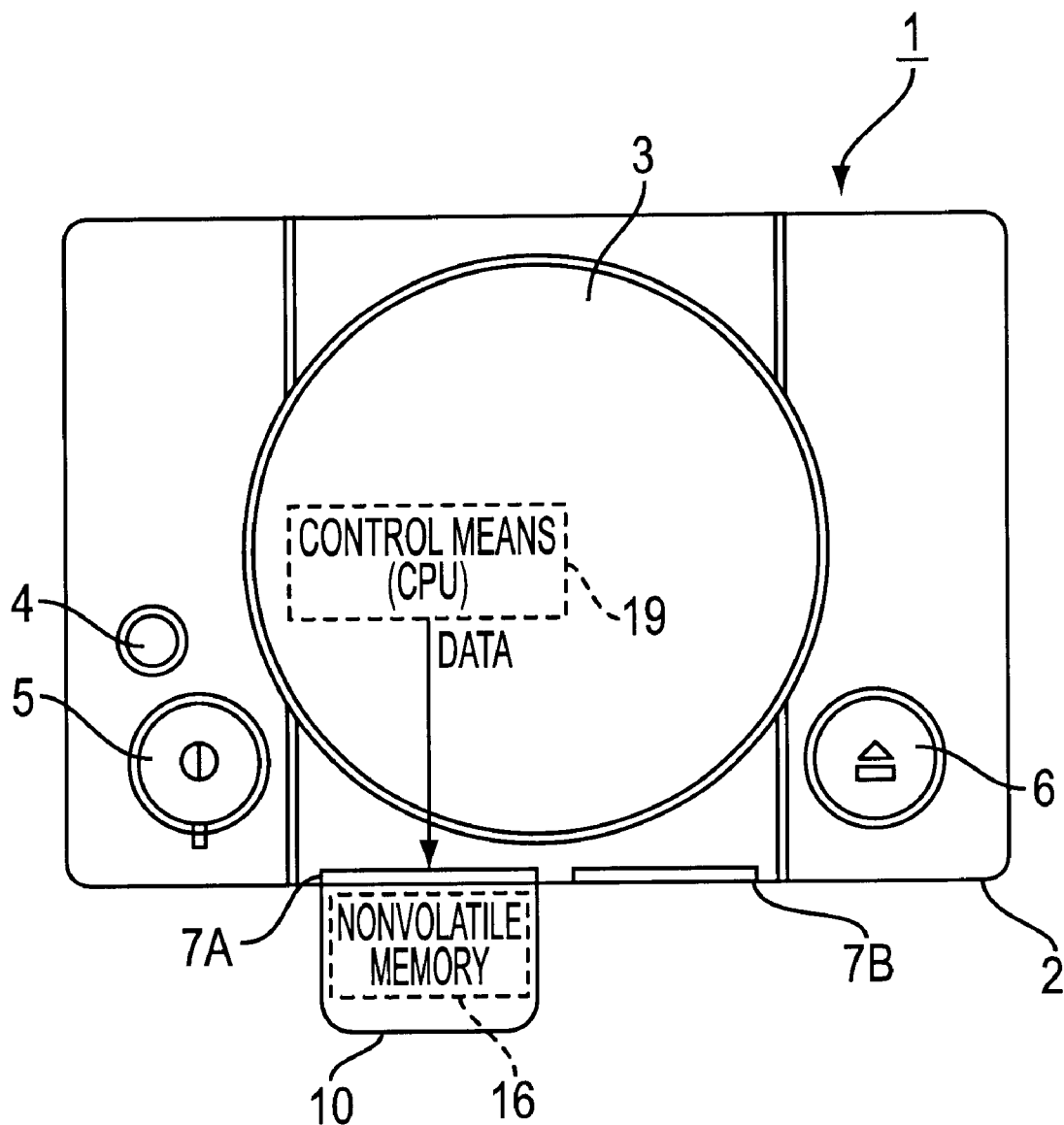
FIG. 2 shows a conventional video game device that uses a memory card device.
Figure 3:
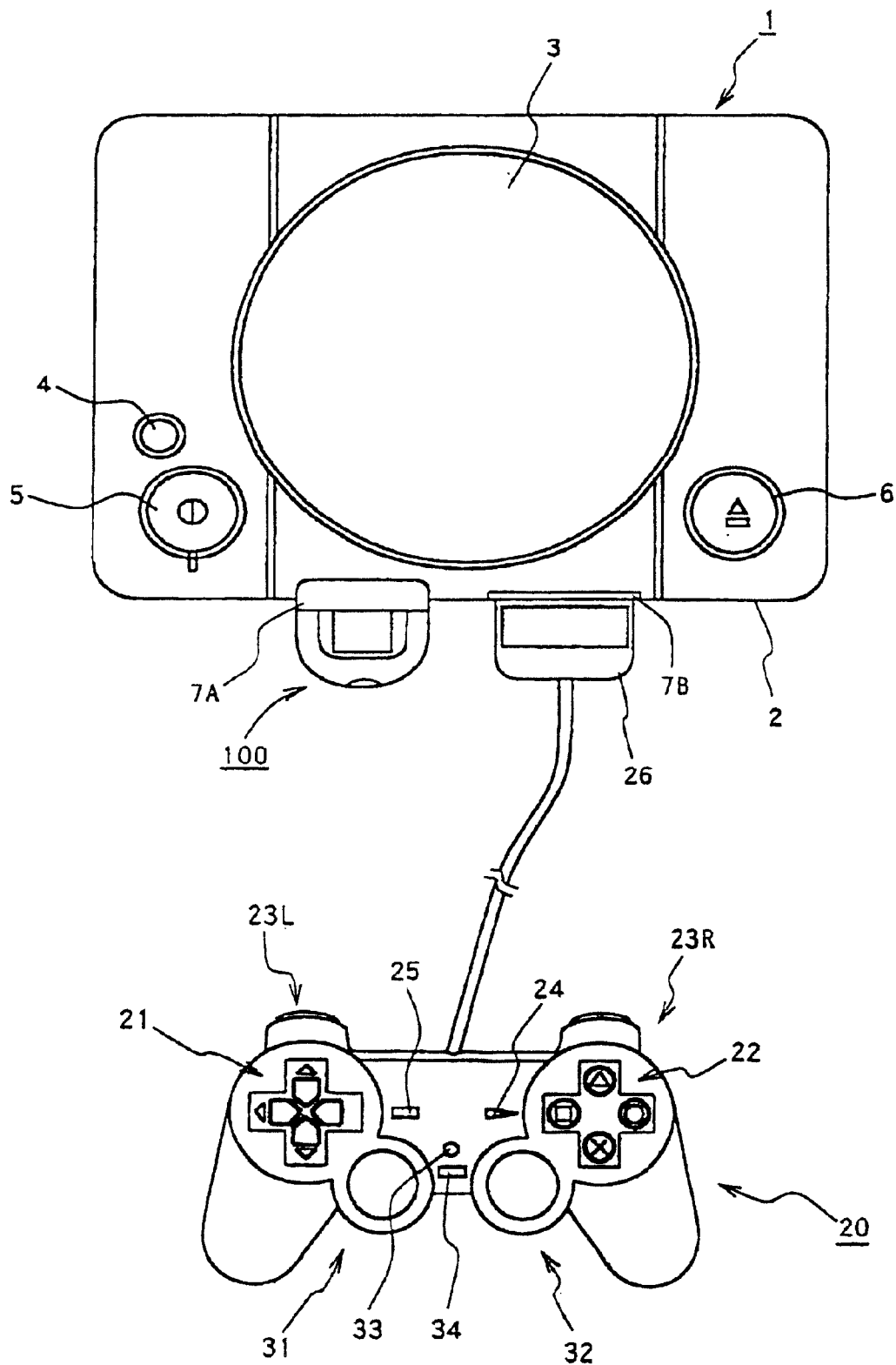
FIG. 3 is a plan view of a video game device employing a portable electronic device according to an embodiment of this invention as a ancillary machine.

FIG. 3 is a plan view of the video game device as the host machine.

A video game device 1 is one for, for example, reading a game program recorded on an optical disk, etc. and executing it according to instructions from the user (game player). Execution of a game means mainly controlling the progress of the game, as well as its display and sound, in accordance with the content of the game.

In video game device 1, a main unit 2 is accommodated in a roughly rectangular housing and has in its middle a disk loading unit 3. An optical disk as a recording medium on which video game application programs are recorded, is loaded on the disk loading unit 3. Also provided on main unit 2 are reset a switch 4 for resetting the game at will, a power switch 5, a disk operation switch 6 that is used when putting an optical disk into or removing it from disk loading unit 3, and, for example, two slots 7A and 7B.

Two operation devices (controllers) 20 can be connected to slots 7A and 7B, allowing two users to play competitive games, etc. One can also insert into these slots 7A and 7B the aforementioned memory card device, or a portable electronic device 100 according to an embodiment of the present invention.

Controller 20 has first and second operation units 21 and 22, a left-hand button 23L and a right-hand button 23R, a start button 24, and a selection button 25. It also has operation units 31 and 32 that are capable of analog operation, a mode selector switch 33 that selects the operation mode of these operation units 31 and 32, and a display unit 34 for displaying the selected operation mode.

Figure 4:
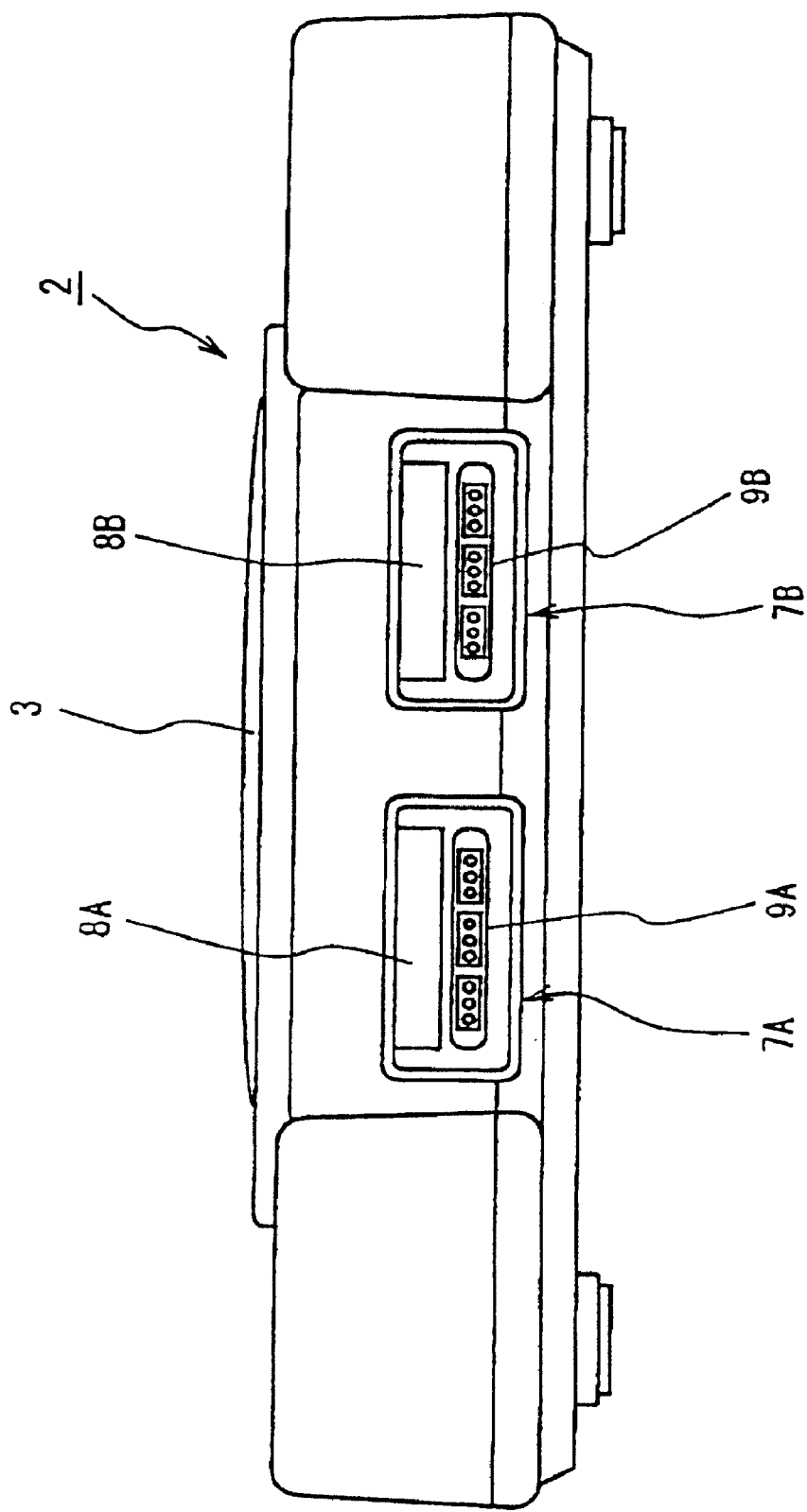
FIG. 4 is a rear view of the video game device, showing the slots of the video game device.

FIG. 4 shows the slots 7A and 7B provided in the front of main unit 2 of video game device 1.

Slots 7A and 7B shown in FIG. 4 are each formed in two levels; provided on the upper level are card insertion parts 8A and 8B for loading aforesaid memory card device 10 or portable electronic device 100 described below. Provided on the lower level are controller connection units (jacks) 9A and 9B to which is connected the connection terminal part (connector) 26 of controller 20.

Figure 5:
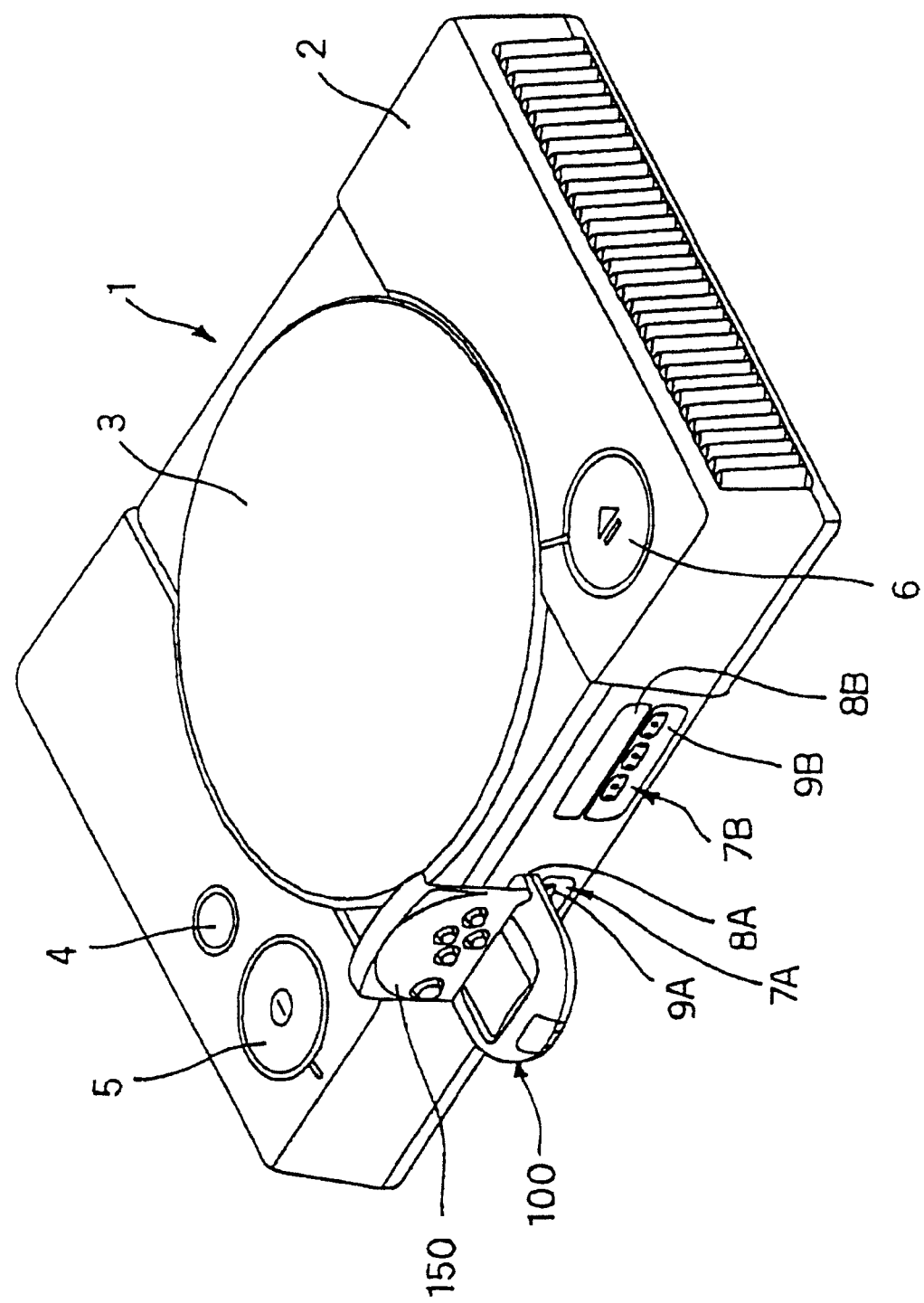
FIG. 5 is a perspective view of the video game device of the embodiment of the present invention.

FIG. 5 shows the state in which the portable electronic device 100 of the embodiment described below is inserted in memory card insertion part 8A of slot 7A formed in the front of video game device 1.

Now, a portable electronic device according to an embodiment of this invention, will be described.

Portable electronic device 100, which is the ancillary machine, is inserted into memory card insertion parts 8A and 8B provided in slots 7A and 7B of video game device 1 (the host machine), and it can also be used as a memory card that is unique to multiple connected controllers 20. For example, if two users (game players) are to play a game, controllers 20 have functions making it possible to store the results of the game, etc. in each of two portable electronic devices 100.

Figure 6:
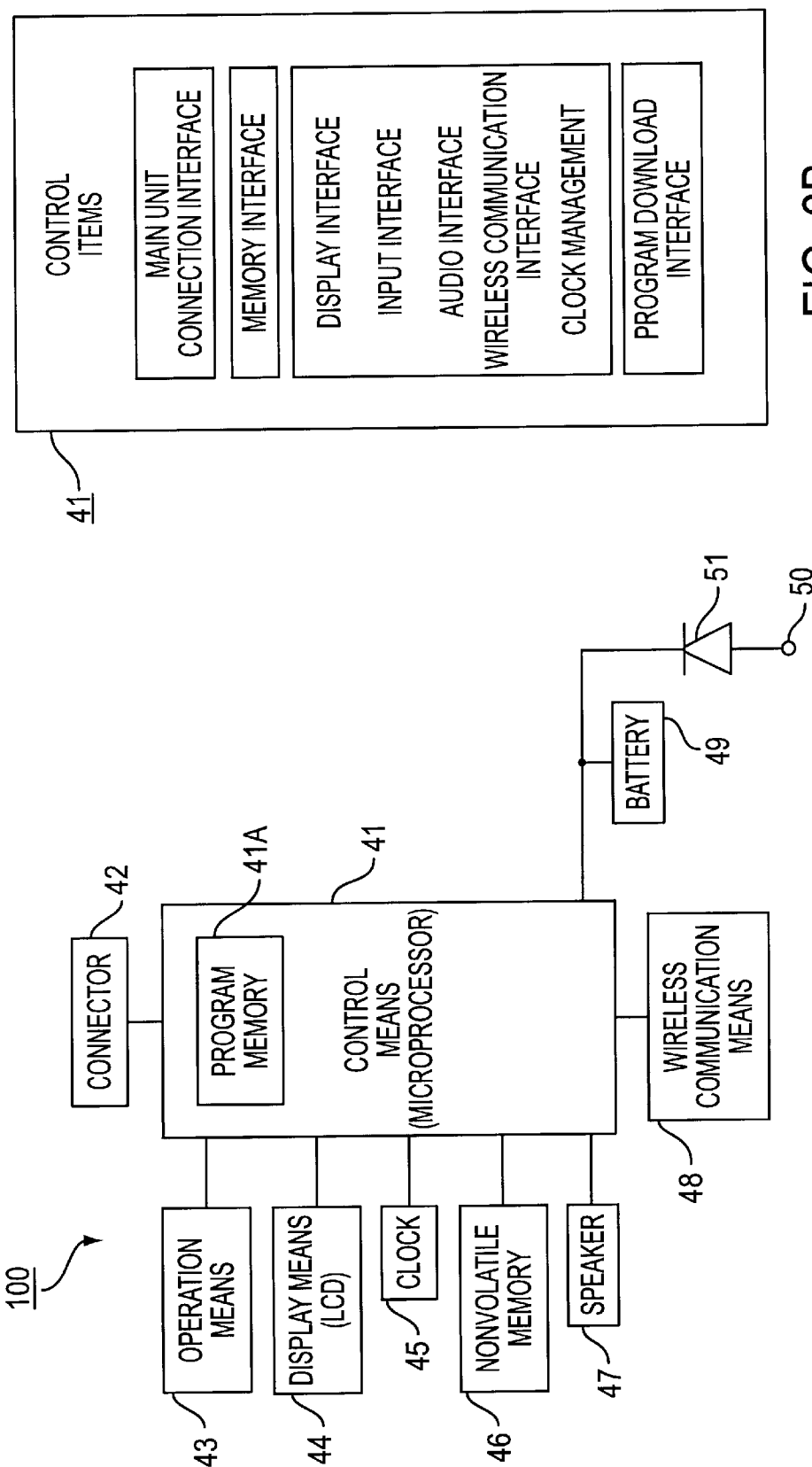
FIG. 6A is a block diagram showing an example of the configuration of the main part of the video game device.
FIG. 6B is a diagram showing control items of the control means of the video game device.

FIG. 6A is a block diagram showing an example of the configuration of the main parts of a portable electronic device.

Like aforesaid ordinary memory card 10, portable electronic device 100 has a control means 41 for controlling its operation, a connector 42 for connecting it to the slot of an information device, etc., and nonvolatile memory 46, which is an element for storing data.

Control means 41 is constituted using, for example, a microprocessor (labeled as such in the diagram) and incorporates program memory unit 41A, which is a program storage means. Also, used as nonvolatile memory 46 is a semiconductor memory element whose recorded state remains even if the power is turned off, such as a flash memory. Because portable electronic device 100 of this invention is constituted so as to have a battery 49 as described below, one may use as nonvolatile memory 46 a static random access memory (SRAM), which allows data to be input and output at high speed.

In addition to the above described elements, portable electronic device 100 includes an operation means 43 for operating stored programs, a display unit 44, which is a display that displays various information in accordance with that program, such as, for example, a liquid crystal display (LCD), a wireless communication unit 48, which sends and receives data with other memory cards, etc. by infrared rays, etc., and a battery 49, which supplies power to all the above components.

Also, portable electronic device 100 has a small built-in battery as a power supply means. Thus it can operate independently even when removed from slots 7A and 7B of host-machine video game device 1. Also, a rechargeable secondary battery may be used as battery 49.

When the ancillary-machine portable electronic device 100 is inserted into slot 7A or 7B of host-machine video game device 1, power is supplied from host-machine video game device 1 to portable electronic device 100. That is, power source terminal 50 is connected to the connection terminal of battery 49 via diode 51 to prevent reverse current. And when inserted into a slot of the host machine, such as above video game device 1, the power source terminal 50 is connected to the power source terminal on the host-machine side, and power is supplied from the host machine to the ancillary machine. Also, if a secondary battery is being used, the secondary battery is also charged.

The portable electronic device 100 also has a clock 45 and a speaker 47, which is a sound emanating means that emanates sound in accordance with that program. Each of the above elements is connected to control means 41 and operates under control of control means 41.

FIG. 6B shows the control items of control means 41. With an ordinary memory card 10, the control means has, as described above, only a main unit connection interface to information devices and a memory interface for inputting and outputting data to memory. However, with portable electronic device 100 according to embodiment of this invention, the control means has, in addition to these interfaces, a display interface, an operation input interface, an audio interface, a wireless communication interface, a time control, and a program download interface.

In this way, portable electronic device 100 can maintain compatibility with previous functions, because it has an interface for managing functions added by this embodiment, independently of the previous functions, which an ordinary memory card device 10 has, such as a main unit (host machine) connection interface and management of the nonvolatile memory.

Also, the portable electronic device 100, which has operation means 43 for operating the program to be executed and display unit 44 which consists of a liquid crystal display (LCD), etc., can be applied as a portable game device.

Because the portable electronic device 100 has also the function of storing in program memory unit 41A of control means 41, a program and data downloaded from the main unit of video game device 1, application programs can be run on portable electronic device 100. In addition, stored application programs and various driver software can easily be modified.

As described above, portable electronic device 100 of this invention can control operations independently of video game device 1. Therefore data according to the application that is stored in program memory unit 41A, which is the program storage unit, can be prepared on the portable electronic device 100 side, independently of the application software on the video game device 1 side. Linkage between portable electronic device 100 as an ancillary machine and video game device 1 as a host machine can be done by exchanging this data with video game device 1.

Moreover, by equipping portable electronic device 100 with a clock 45, time data can be shared with video game device 1. That is, they can not only synchronize their time data with each other but also share data for controlling in real time the progress of a game that each is executing independently.

Outer structure of the portable electronic device will be described next.

Figure 7:
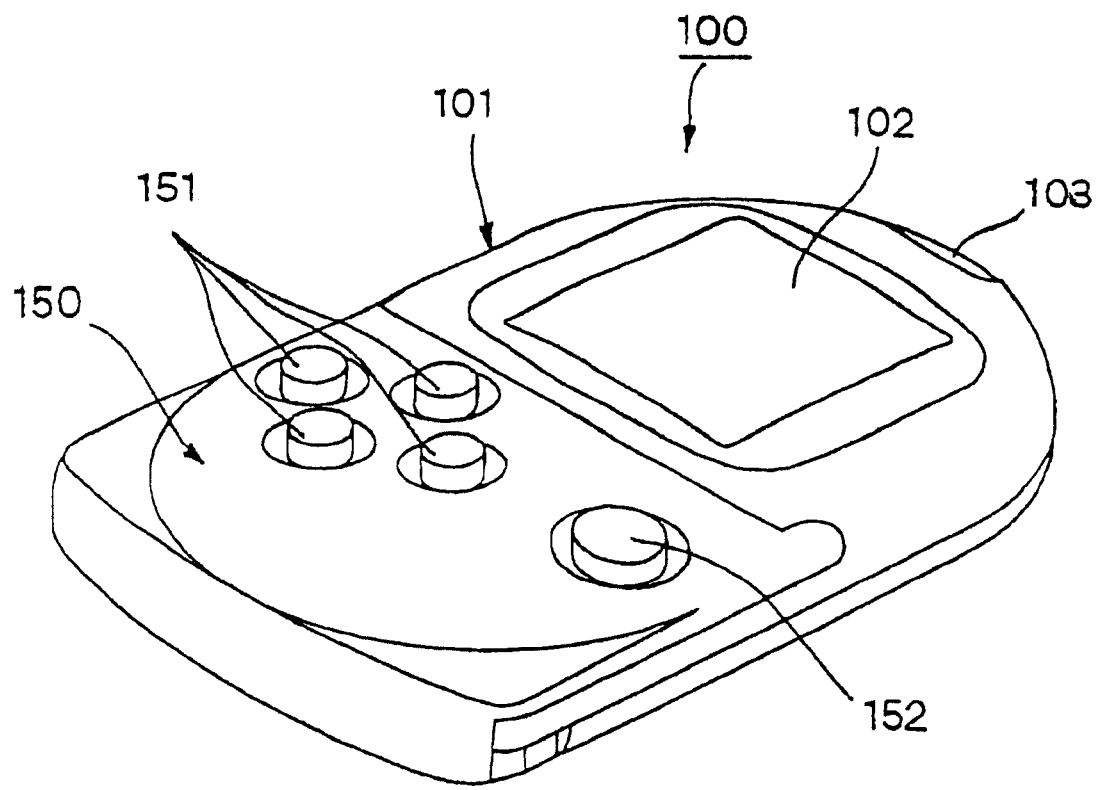
FIG. 7 is a perspective view of the portable electronic device according to an embodiment of this invention.
Figure 8:
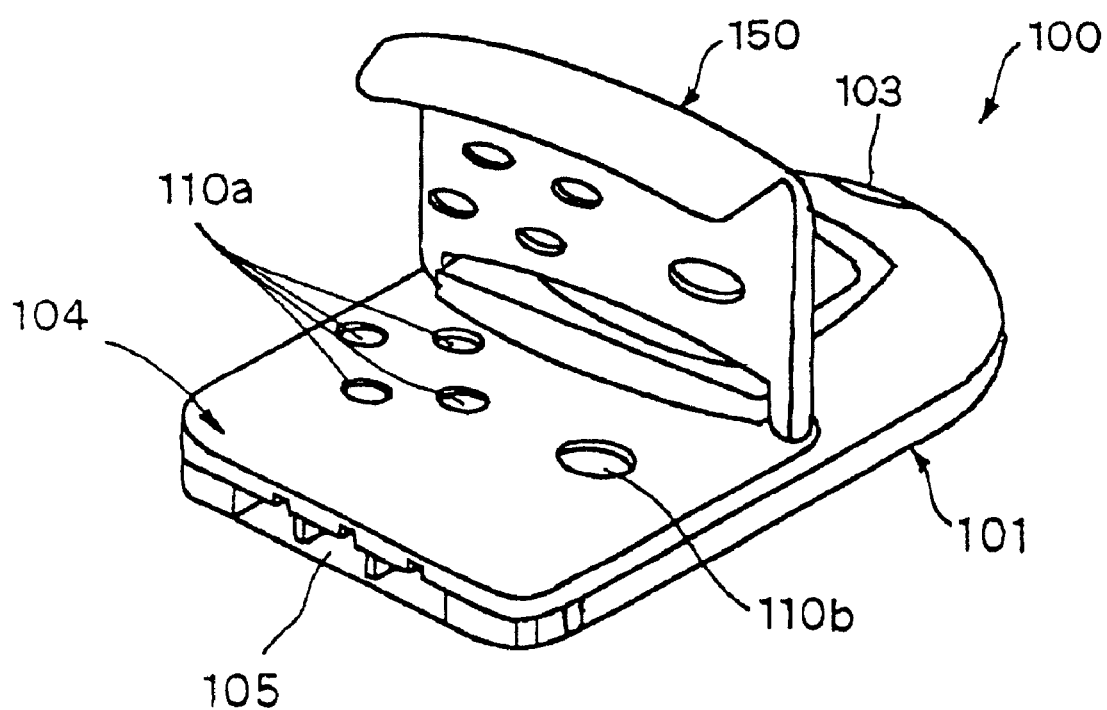
FIG. 8 is a perspective view showing, an operation panel of the portable electronic device of the present invention, with the cover open.
Figure 9:
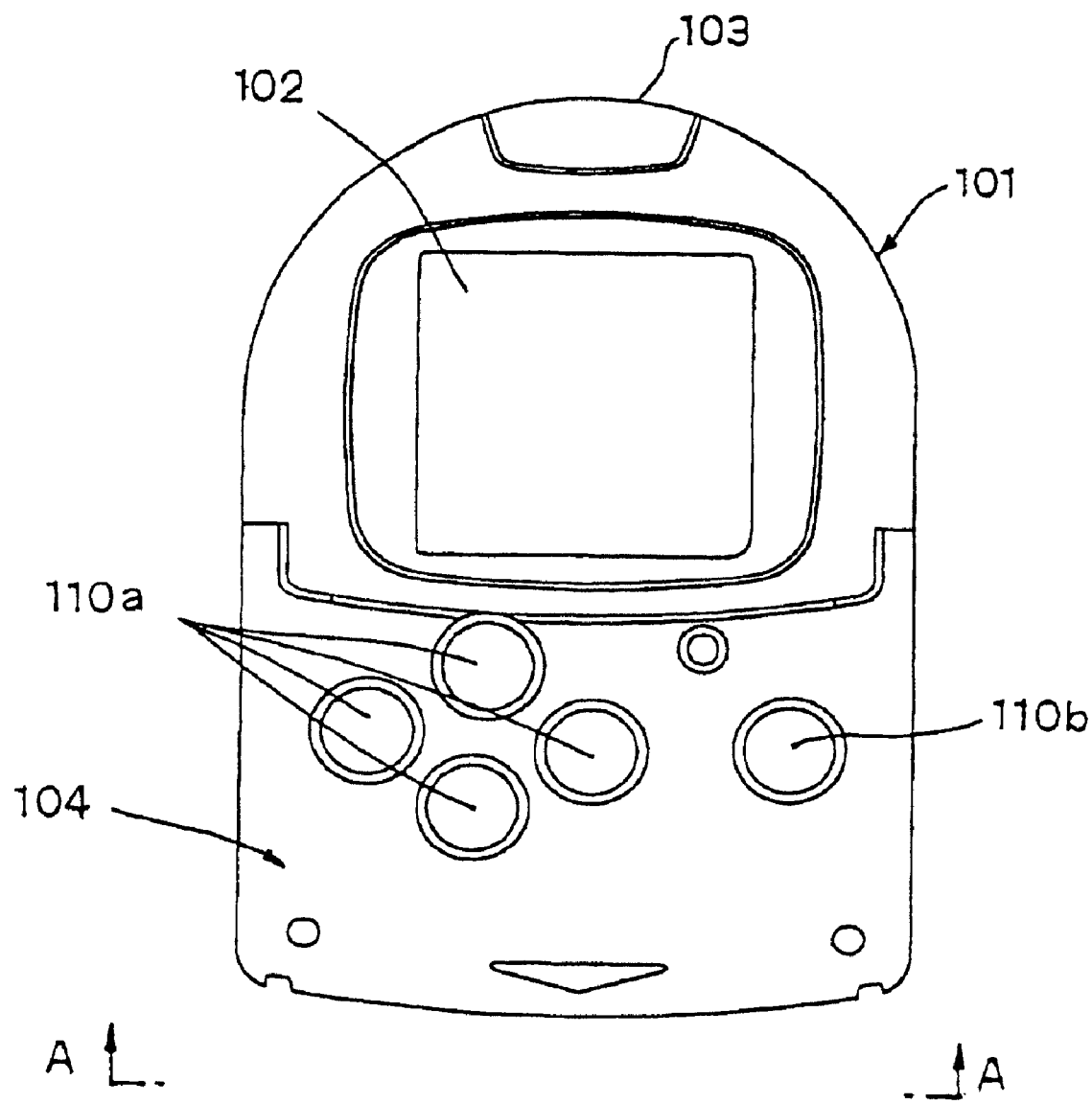
FIG. 9 is a plan view of the main unit, with the operation panel removed.
Figure 10:
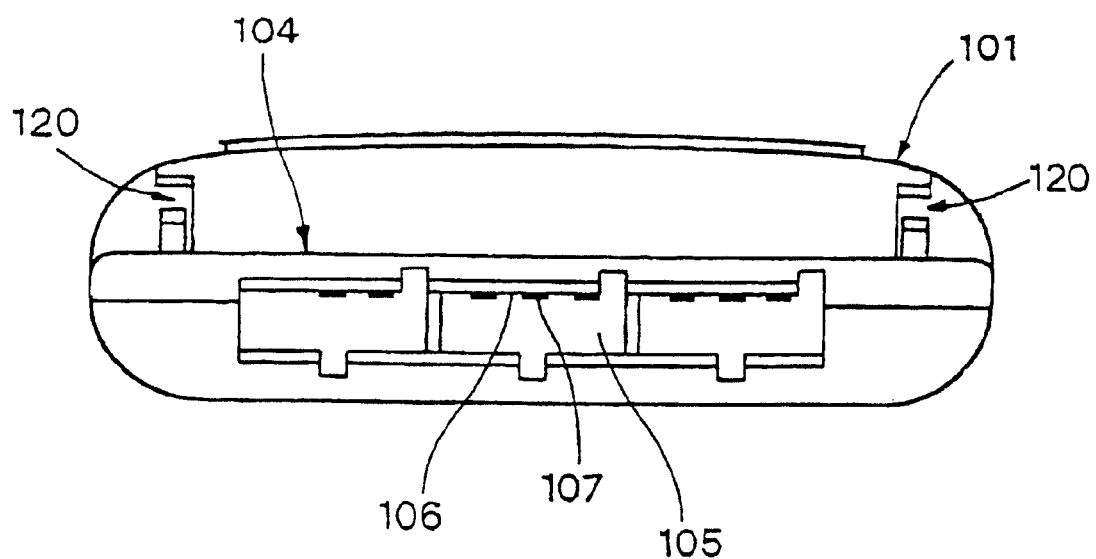
FIG. 10 is a view seen from the direction of arrows A—A of FIG. 9.
Figure 11:
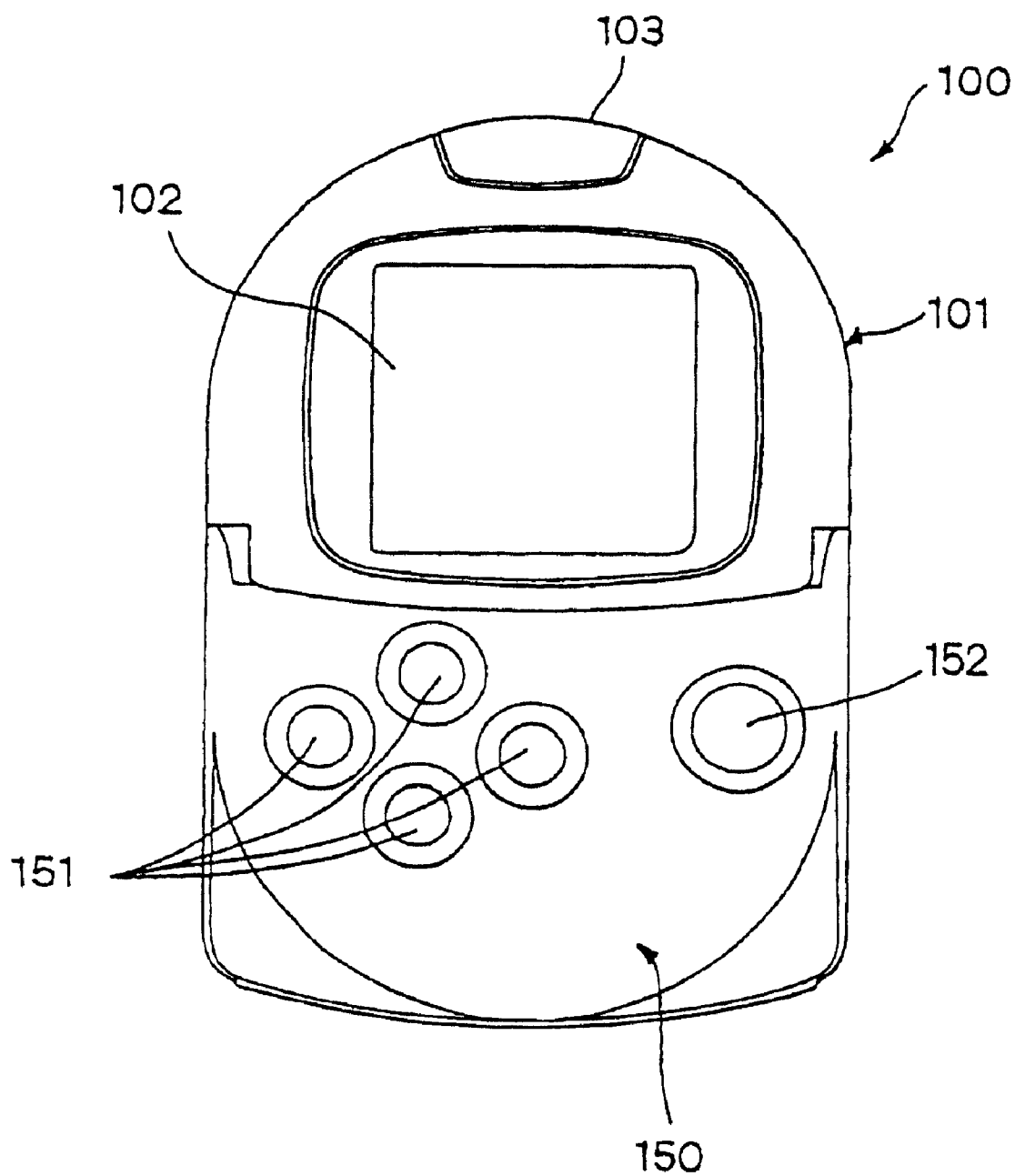
FIG. 11 is a plan view of the operation panel in a closed state.

FIGS. 7 to 11 show the portable electronic device 100 of the present invention in detail. FIG. 7 is a perspective view of the device in the state in which an operation panel 150 is closed, FIG. 8 is a perspective view of the device in the state in which operation panel 150 is open, FIG. 9 is a plan view of a main unit 101 of the device with operation panel 150 removed, FIG. 10 is a view seen from the direction of arrows A—A of FIG. 9, and FIG. 11 is a plan view of the device in the state in which operation panel 150 is closed.

The structure of portable electronic device 100 is such that operation panel 150 can be freely attached to and detached from the main unit 101. Display unit 102, which consists of a liquid crystal display element (LCD), etc., is provided on main unit 101 in the area of roughly the upper half of its upper surface. The display unit 102 corresponds to display means 44 shown in FIG. 6A. A window unit 103 is provided on the tip end of main unit 101, and wireless communication by wireless communication unit 48 shown in FIG. 6A is done through window unit 103.

As shown in FIG. 8, a slot insertion part 104 is formed on roughly the lower half of device main unit 101. The slot insertion part 104 is inserted into memory card insertion part 8A and 8B (see FIGS. 3 to 5) in slots 7A and 7B of the video game device 1 (the most machine). That is, the slot insertion part 104 is formed in a shape that corresponds to memory card insertion parts 8A and 8B, and on its base end face is formed a connector part 105, which constitutes connector 42 shown in FIG. 6A.

Built into main unit 101 is a circuit board 106 (FIG. 10), which constitutes an electronic circuit centered on control means 41 of FIG. 6A, and a terminal part 107, which is formed on one end of circuit board 106, is exposed inside connector part 105 (FIG. 5).

Therefore, by inserting slot insertion part 104 into memory card insertion parts 8A and 8B in slots 7A and 7B of video game device 1, terminal part 107 can be connected to the connection interface of video game device 1, making it possible to exchange data with video game device 1. At the same time, power is supplied via terminal part 107 from video game device 1 to portable electronic device 100.

As shown in FIG. 9, operation switch pressing parts, namely, a first switch pressing part 110a, and a second switch pressing part 110b, are provided, with being exposed, on the upper surface of slot insertion part 104 in device main unit 101. Operation switches (not shown) are constituted by, for example, diaphragm switches and are mounted on circuit board 106 built into main unit 101. These operation switches are operated by pressing switch pressing parts 110a and 110b. Control means 41 shown in FIG. 6A causes a program to be executed by inputting the state of the operation switches.

Provided in this embodiment are first switch pressing parts 110a, which are in a group of four, and second switch pressing part 110b, which is a single independent switch, as shown in FIG. 9. The functions of these switch pressing parts 110a and 110b are given by the program stored in control means 41. For example, first switch pressing parts 110a may be assigned the function of moving characters of the game program stored in control means 41 up, down, left, and right. And second switch pressing part 110b may be assigned the function of beginning or resetting the game program stored in control means 41.

Operation panel 150, which is mounted rotatably on main unit 101, shuts and protects the top surface and connector part 105 of slot insertion part 104 as shown in FIG. 7, and opens, as shown in FIG. 8, to reveal these parts of slot insertion part 104. When slot insertion part 104 is inserted into memory card insertion parts 8A and 8B in slots 7A and 7B of video game device 1 (the host machine), operation panel 150 is in the open state as shown in FIG. 8.

Figure 12:
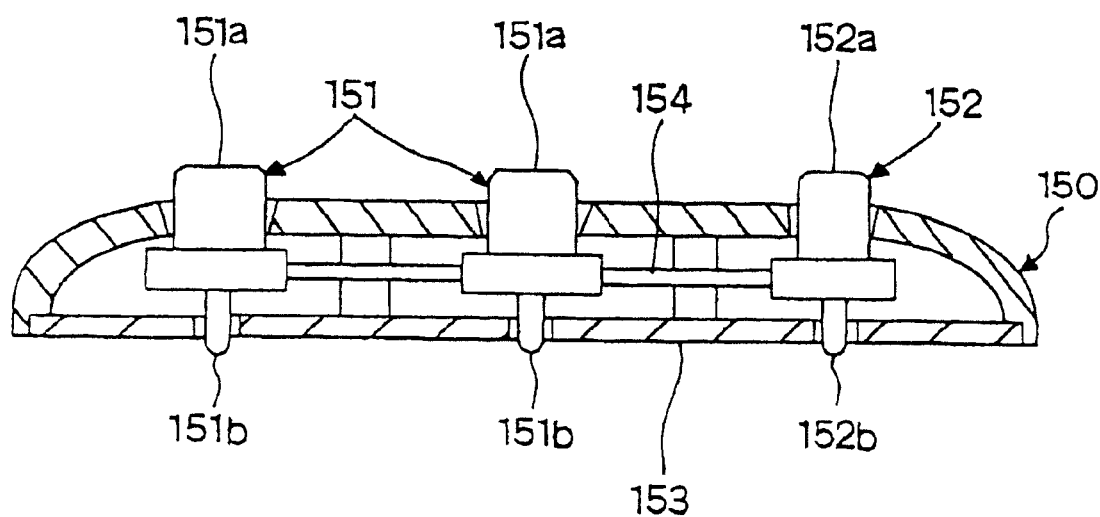
FIG. 12 is a cross-sectional view of the operation panel.

Four first operation buttons 151 and one second operation button 152 are provided on operation panel 150, as shown for example in FIG. 11. In these operation buttons 151 and 152, as shown in FIG. 12, their top parts 151a and 152a are exposed from the upper surface of operation panel 150, and their lower ends 151b and 152b freely protrude and retract from a base panel 153 mounted on the rear surface of operation panel 150.

Figure 13:
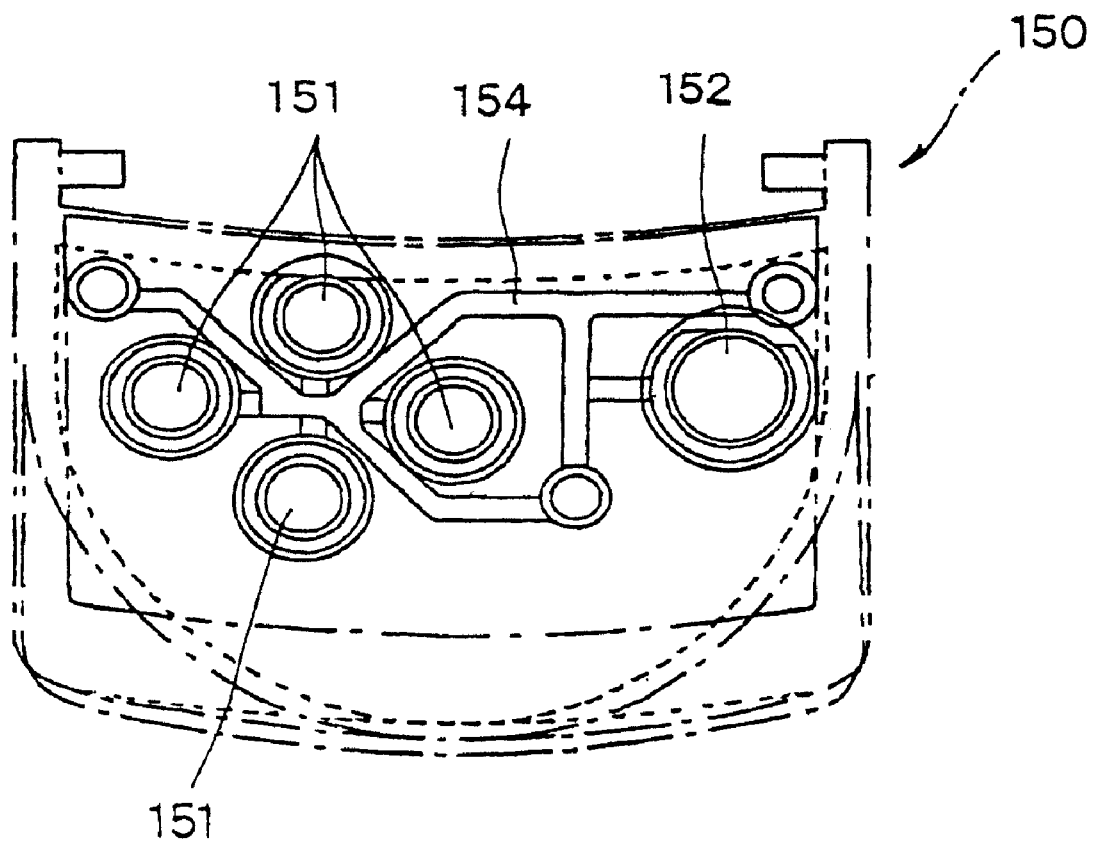
FIG. 13 is a plan view of the operation buttons provided on the operation panel of the present invention, showing its configuration.

These operation buttons are linked by a runner 154 as shown in FIG. 13. That is, operation buttons 151 and 152 and runner 154 are formed integrally from a plastic material and are assembled into operation panel 150 as a single part. Therefore the assembly operation is easy, and the efficiency of assembly can be improved.

Runner 154 has springiness and provides a restoring force to operation buttons 151 and 152. The top parts 151a and 152a of the operation buttons are pressed by the user, and when this is done, runner 154 sags, and when the pressing force on top parts 151a and 152a is released, operation buttons 151 and 152 push up and are restored to their original positions.

When the top parts 151a and 152a of the operation buttons are pressed, their lower ends 151b and 152b protrude from base panel 153. Lower ends 151b and 152b of the operation buttons are positioned so as to be opposed to first and second switch pressing parts 110a and 110b, respectively, that are formed in slot insertion part 104 of main unit 101. Therefore lower ends 151b and 152b of the first or second operation buttons that protrude from base panel 153 press the corresponding first or second switch pressing parts 110a and 110b. In this way, the operation switches are operated.

Figure 14:
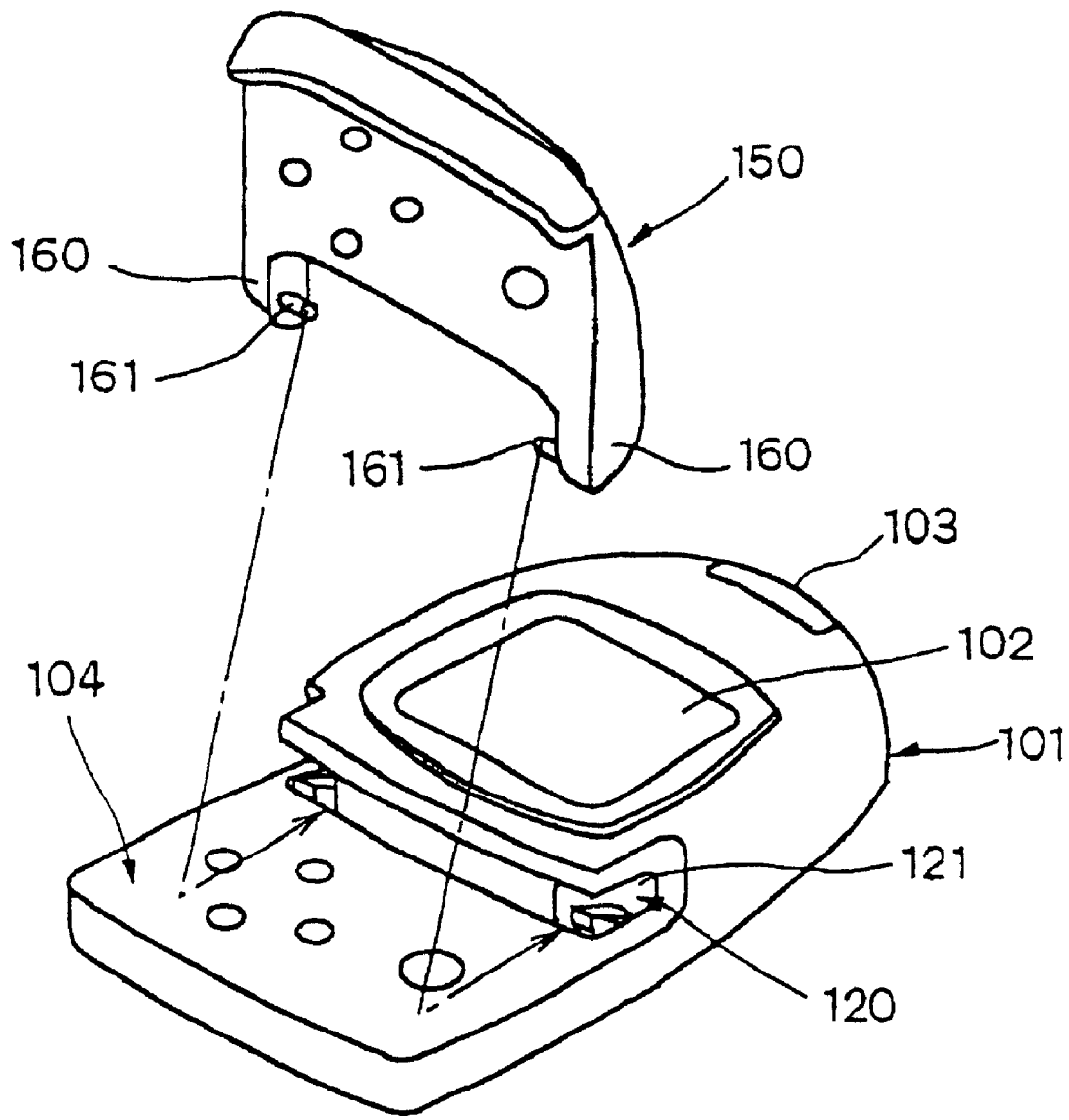
FIG. 14 is a perspective view showing the state in which the operation panel of the portable electronic device is removed.
Figure 15:
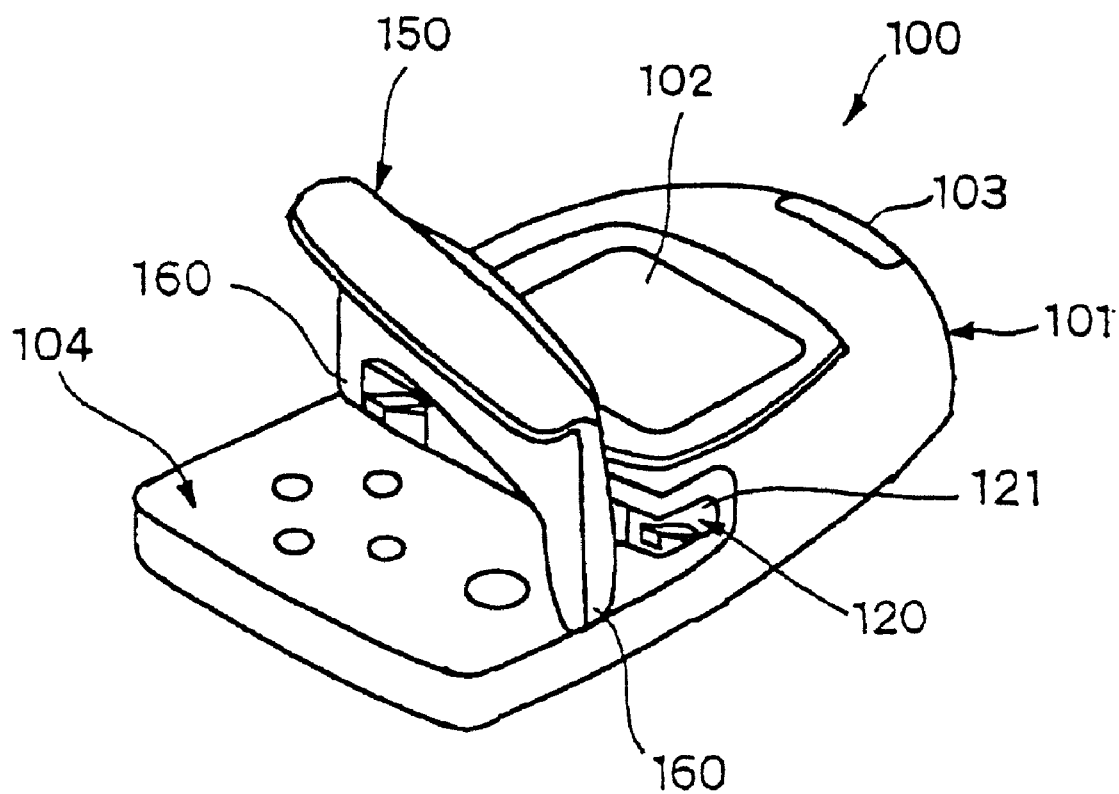
FIG. 15 is a perspective view showing the process of removing the operation panel of the portable electronic device.
Figure 16:
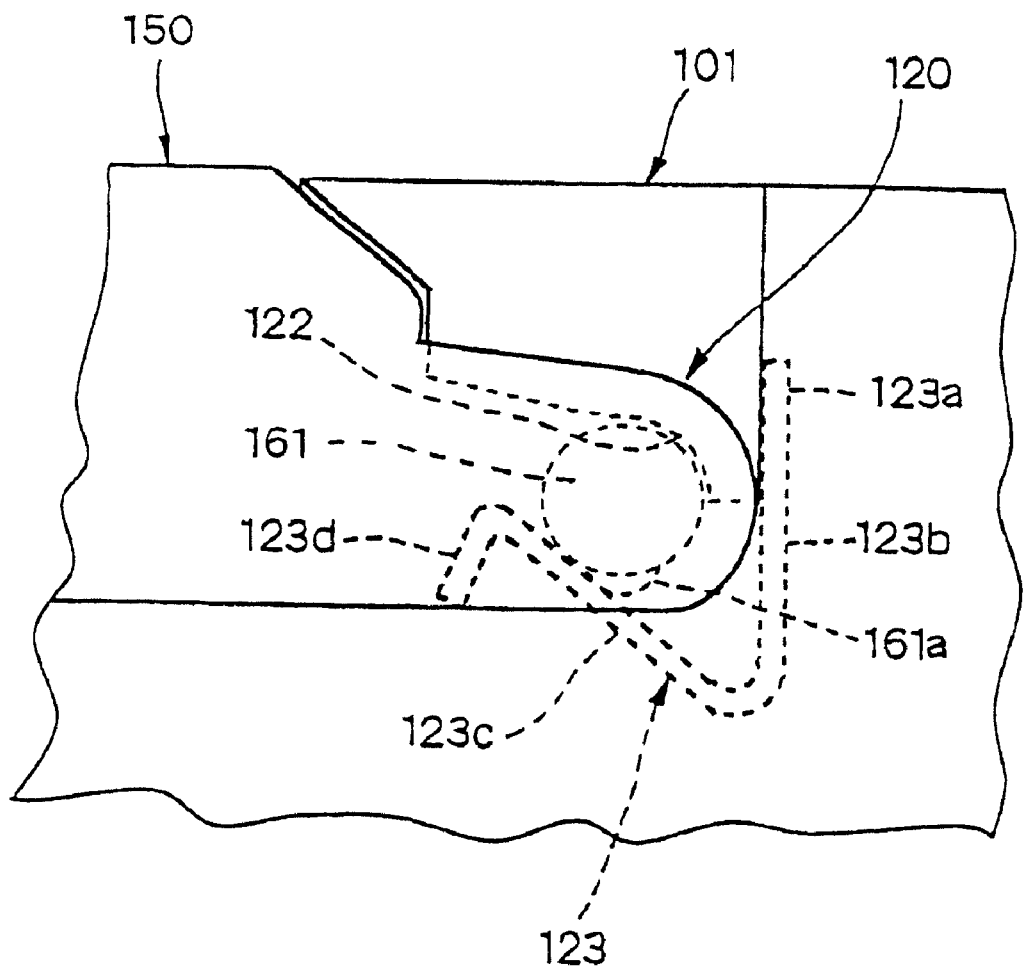
FIG. 16 is an enlarged partial side view of a hinge structure for detachably mounting the operation panel onto the main unit.
Figure 17:
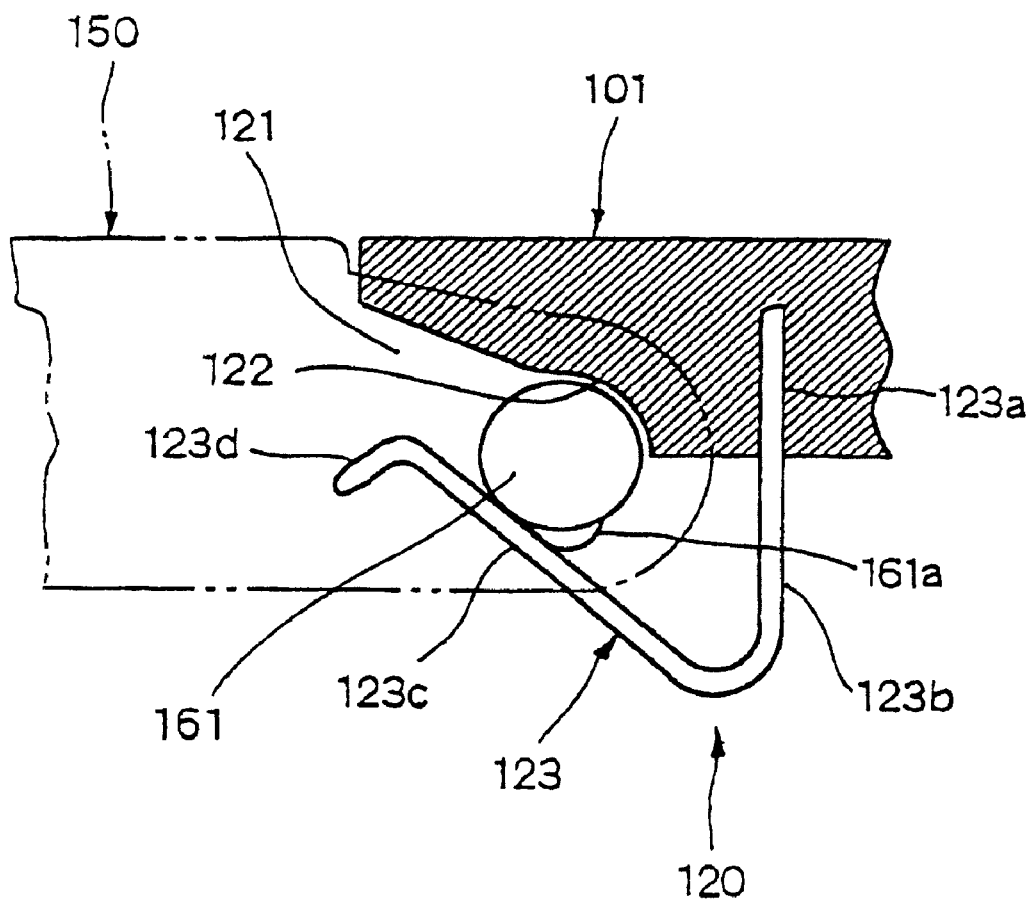
FIG. 17 is an enlarged partial cross-sectional side view showing the hinge structure.

As shown in FIGS. 14 and 15, operation panel 150 is detachable from device main unit 101. That is, a detachable hinge structure is formed between operation panel 150 and device main unit 101 as shown in FIGS. 16 to 20.

The hinge structure will hereinafter be described.

As shown in FIGS. 14 and 15, a pair of arms 160, 160 are formed on both sides of the base of operation panel 150, and support shafts 161, 161 protrude from these arms 160, 160 inwards one toward another. By fitting support shafts 161, 161 into the pair of bearing parts 120, 120 formed in main unit 101, operation panel 150 is rotatably held.

Bearing part 120 is constituted inside a groove 121 formed in main unit 101 and has a structure whereby first and second bearing parts cooperatively hold support shafts 161 as will be described below.

The first bearing part is formed in part of main unit 101. That is, an arc-shaped curved surface 122 (FIG. 16) is formed on the inner surface of the upper part of groove 121, and this curved surface 122 constitutes the first bearing part.

The second bearing part is formed by a bent flat spring 123. The flat spring 123 has a fixed part 123a, which is anchored to main unit 101, a descending part 123b, which descends from the fixed part 123a, a slanting part 123c, which extends diagonally upward from the lower end of the descending part 123b, and a free end 123d which slants obliquely downward from the upper end of the slanting part 123c. Slanting part 123c, in cooperation with the curved surface 122 which is the first bearing part holds support shaft 161.

Free end 123d of the flat spring is positioned near the opening of groove 121 formed in main unit 101. The gap between the inner surface of the upper part of groove 121 and flat spring 123 is narrowest near the opening and becomes gradually wider toward slanting part 123c of the flat spring.

Figure 18A:
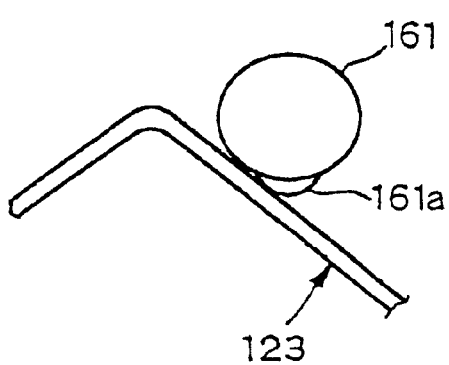
FIGS. 18A–18C are diagrams for explaining a cam arrangement of the hinge structure.
Figure 18B:
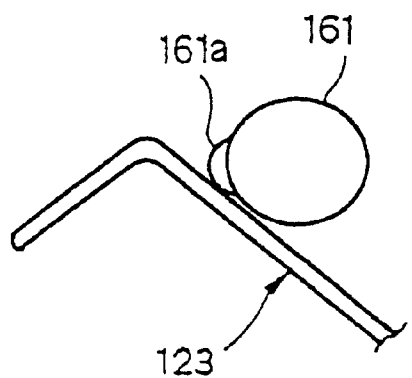
Figure 18C:
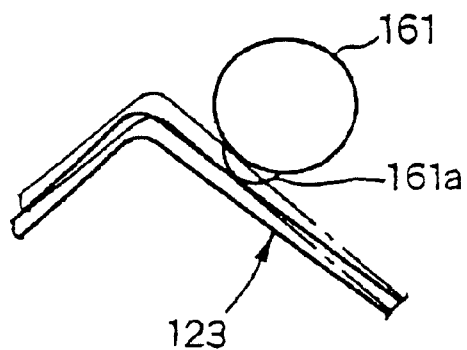

Formed on the circumferential surface of support shaft 161 is a cam 161a (FIG. 17), which is partly convex. Cam 161a is formed on the circumferential surface of support shaft 161 at the position where during the rotation of operation panel 150, the flat string 123 elastically rides over it. That is, cam 161a is in the position shown in FIG. 18A when operation panel 150 is open, and is in the position shown in FIG. 18B when operation panel 150 is shut. During the rotation of operation panel 150, as shown in FIG. 18C, it comes into contact with flat spring 123 and elastically displaces and rides over flat spring 123.

By thus forming cam 161a on support shaft 161, one obtains pop-up force when operation panel 150 is opened and pull-in force when operation panel 150 is closed. That is, one obtains a flip feeling.

Also, operation panel 150 rotates in a range of about 90 and forms a shut state or an open state. In the open state, arm 160 interferes with main unit 101 and prevents any further rotation.

Figure 19:
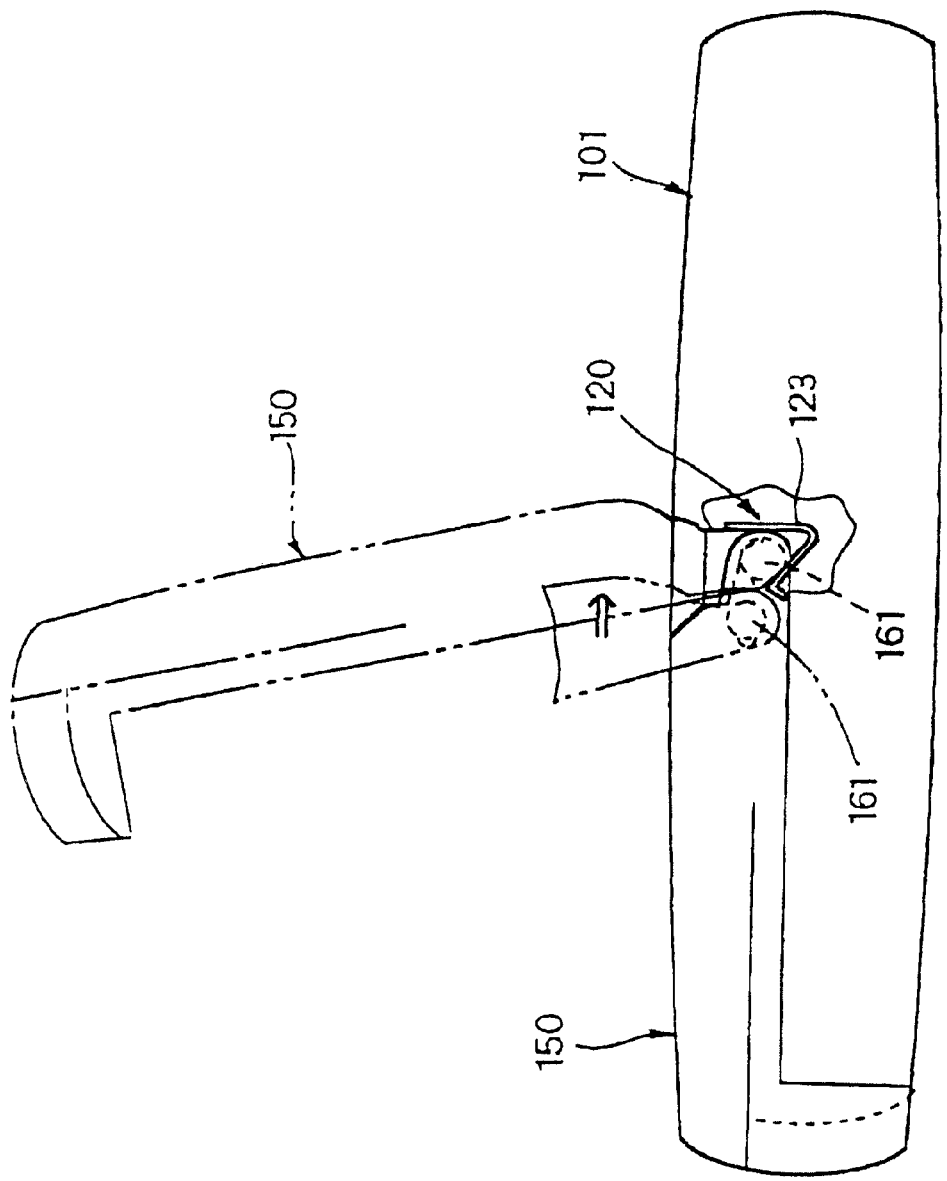
FIG. 19 is a diagram for explaining the mounting operation of an operation panel to which the hinge structure is applied.

As shown in FIG. 19, operation panel 150 can be attached or detached by fitting it into or separating it from bearing part 120 in the radial direction of support shaft 161, making use of elastic deformation of flat spring 123.

Figure 20:
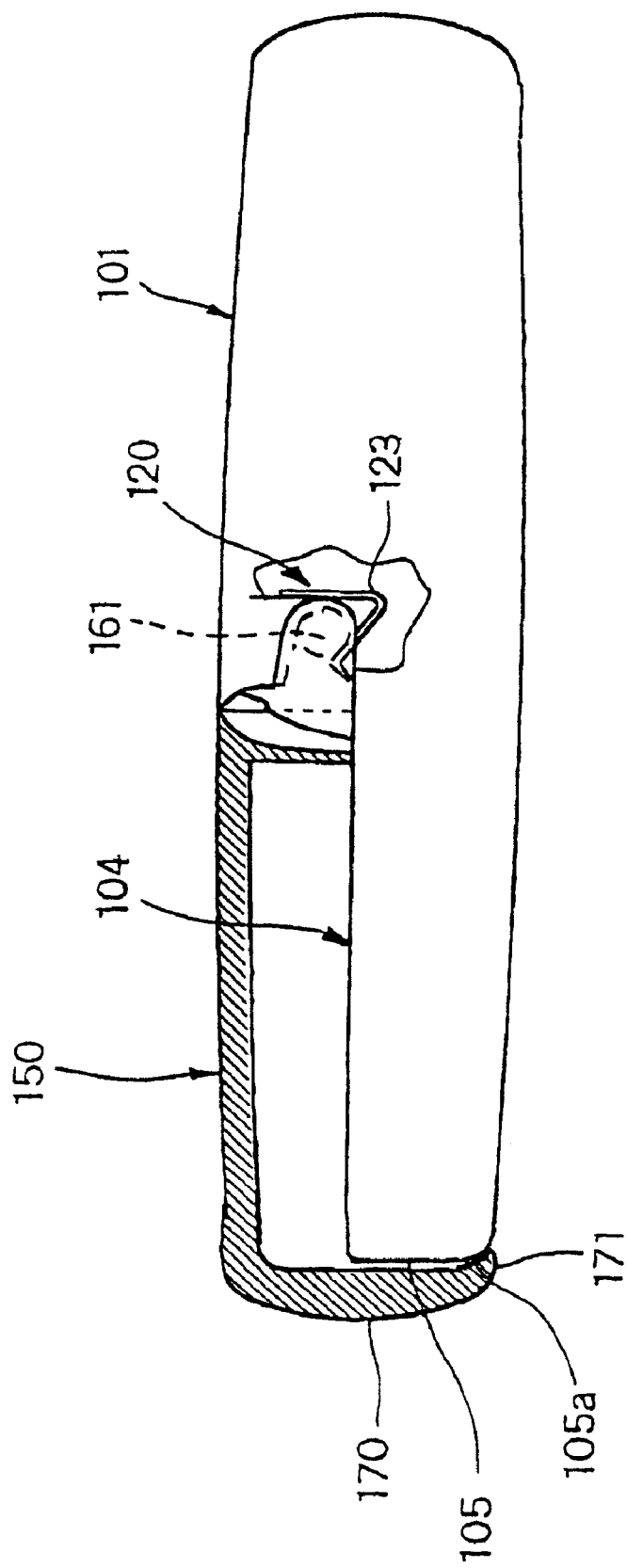
FIG. 20 is a diagram for explaining a shut state of an operation panel to which the hinge structure is applied.
Figure 21:
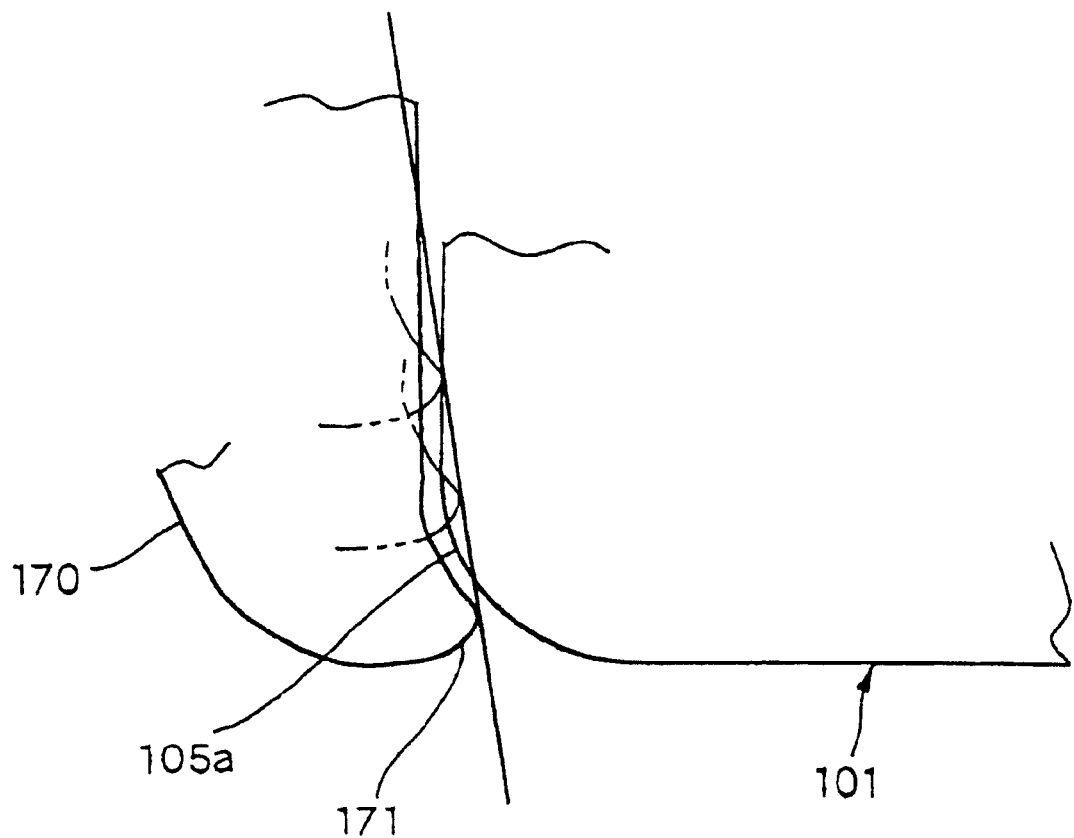
FIG. 21 is a diagram for explaining the state of opening and closing of an operation panel to which the hinge structure is applied.

As shown in FIGS. 20 and 21, formed on the opposite side of support shaft 161 of operation panel 150, is a cover 170 for covering connector part 105. Provided on the end of cover 170, is an engagement protrusion 171 which engages with engagement part 105a which is formed on the bottom of the end face of main unit 101 in the shut state.

Cover 170 is concave on the inner surface side, thereof that is, on the side that is opposite the main unit 101. On the other hand, the end face where connector part 105 is formed in main unit 101 is convex. When operation panel 150 is shut or opened, the engagement protrusion 171 slides over engagement part 105a which is formed on the bottom of the end face of main unit 101. At this time, force operates on operation panel 150 in the direction to pull out support shaft 161 from bearing part 120. This force deforms flat spring 123 so as to spread it open. This provides a click feeling when operation panel 150 is closed, and when operation panel 150 is completely closed, engagement protrusion 171 is pushed against main unit 101 by the springy force from flat spring 123, preventing any looseness or rattling.

With such hinge structure, if force in the direction to pull out support shaft 161 from bearing part 120 is applied to operation panel 150, the flat spring 123 spreads open, and support shaft 161 can be removed from bearing part 120 without forcing it. Conversely, if support shaft 161 formed on operation panel 150 is pressed into bearing part 120, the flat spring 123 spreads open, the support shaft 161 is led into bearing part 120, and a freely rotatable holding state is formed.

Also, when, for example, force is applied to operation panel 150 in its open state so as to further rotate it in the direction to open it, the flat spring 123 spreads open and support shaft 161 is quickly separated from bearing part 120, thus avoiding any damage to support shaft 161 or operation panel 150 or to device main unit 101.

The operation panel 150 has four first operation buttons 151 and one second operation button 152 (for example, see FIG. 11), but in portable electronic device 100 of this embodiment, the operation panel 150 can be arbitrarily replaced.

That is, in this embodiment, various types of operation panel 150 are made available, and one can arbitrarily select them and mount them on device main unit 101. Each operation panel 150 that is made available has the above-described support shaft 161 and its peripheral structure, and can be mounted detachably on bearing part 120 of main unit 101.

Figure 22:
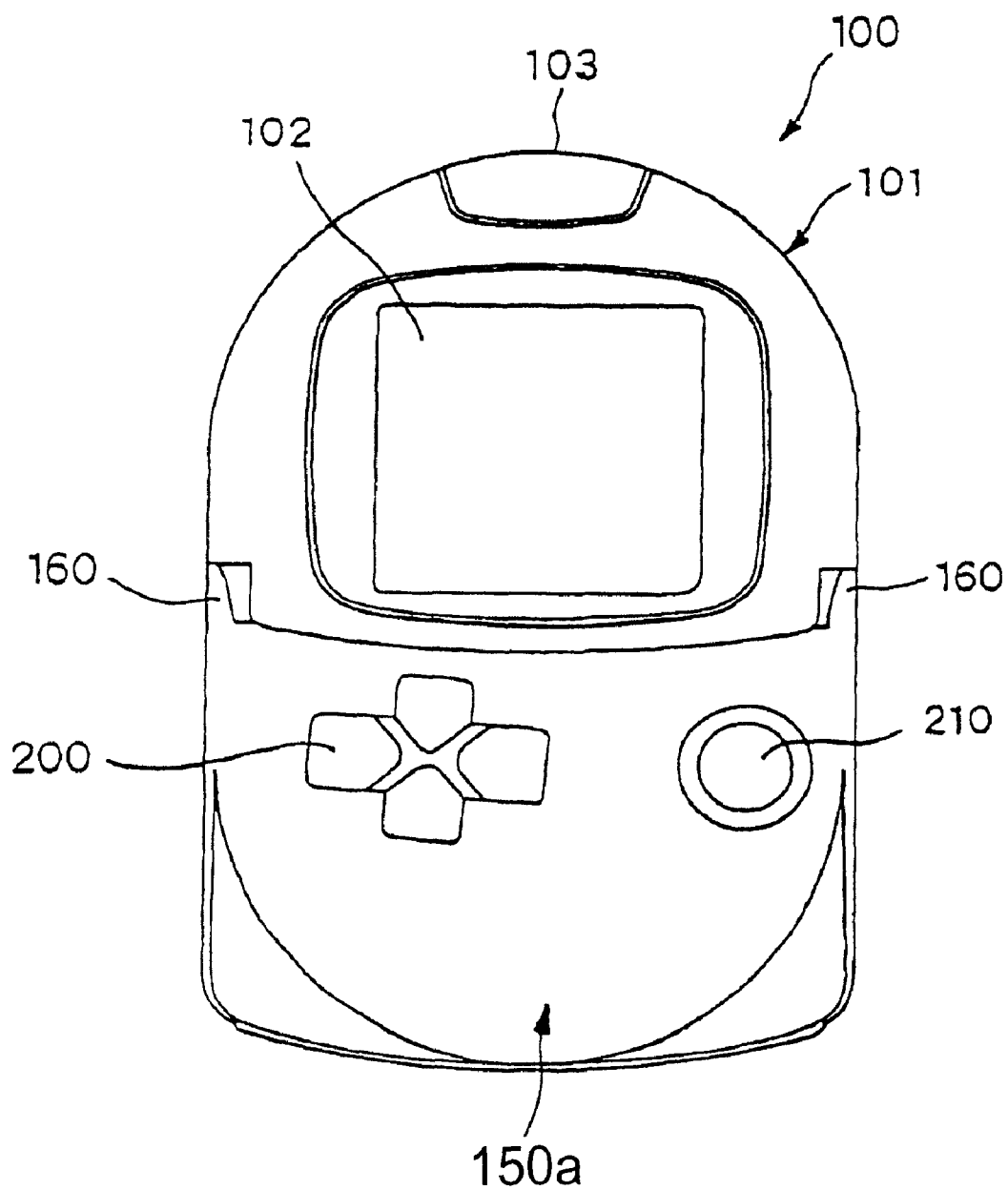
FIG. 22 is a plan view showing another embodiment of an operation panel having operation buttons of plus-key type.
Figure 23:
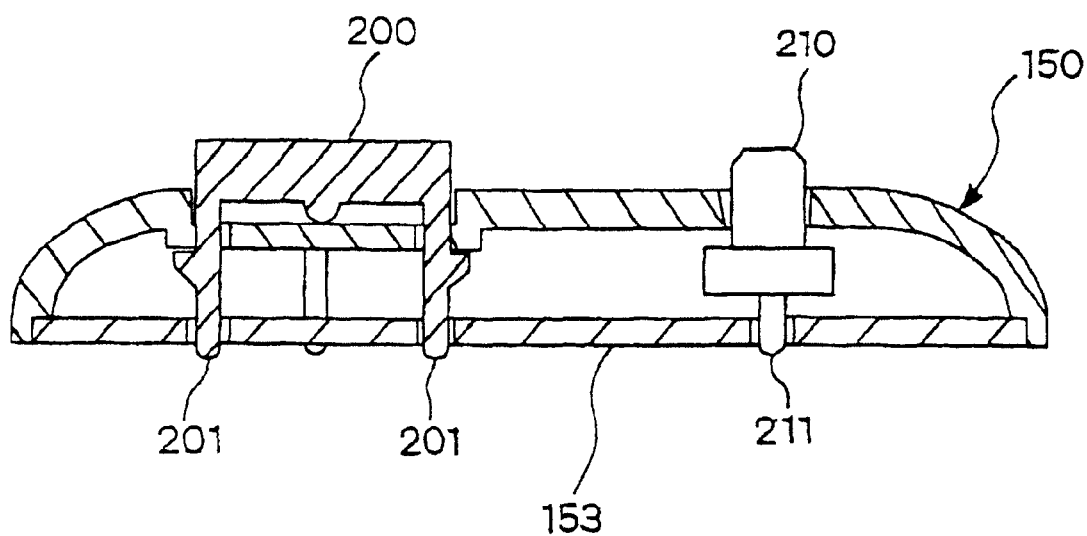
FIG. 23 is a cross-sectional view of the operation panel of FIG. 22.

FIG. 22 shows the portable electronic device in which a different type of operation panel 150a from the above described operation panel 150 (for example, see FIG. 11) is mounted. Operation panel 150a shown in FIG. 22 has a plus-key type first operation button 200 and a second operation button 210. In plus-key type first operation button 200, each end—at top, bottom, left, and right—is a pressing operation part, and operation nubs 201 extend from the lower surface of the operation parts, as shown in FIG. 23. The operation nubs 201 freely protrude and retract from base panel 153, which is mounted on the rear surface of operation panel 150.

When any end in first operation button 200 is pressed, the operation nub 201 that extends from the lower surface of that end protrudes from base panel 153. When operation panel 150a is in shut state, each operation nub 201 is positioned so as to be opposed to a corresponding first switch pressing part 110a formed in slot insertion part 104 of device main unit 101. Therefore operation nub 201 which protrudes from base panel 153 presses the corresponding first switch pressing part 110a. In this way, the operation switches are operated.

Also, as with operation panel 150 shown in FIGS. 11 and 12, in second operation button 210, the lower end 211 is positioned so as to be opposed to second switch pressing part 110 b, and a pressing operation presses the switch operation part 110b.

The above-described plus-key type first operation button 200 is suitable for a game program that requires nimble operation, such as an action game. In this embodiment, according to the content of the program that is downloaded to portable electronic device 100, an operation panel 150 that has operation buttons suitable for such operation can be mounted, which makes it possible to realize good operability.

Even with the same type of operation buttons, it is possible to appropriately change their size, height, feel, color, and other properties and select and mount operation panel 150a to fit the tastes of the user. For example, one may have a full repertoire of operation panels 150, whose operation buttons may have sure-grip rubber tops or may be painted with glow-in-the-dark paint to be visible even in the dark.

In addition, it is effective in satisfying user tastes to have available operation panels of various types, with different surface textures and color schemes.

In the above-described embodiment, an example in which the present invention is applied to a portable electronic device that serves as the ancillary machine of a video game device has been described. However, this invention is not limited to this example; it can also be applied to various types of portable electronic devices (for example, an independent portable game device or a remote control device) having an operation panel that is rotatably mounted on the main unit.

As described above, this invention makes it possible to freely attach and detach an operation panel to and from said device main unit and allows it to be replaced with different operation panels, thereby allowing one to select an operation panel as desired, satisfying user tastes, and improving operability.

What is claimed is:

1. A portable electronic device used as an ancillary machine for a video game device, the portable electronic device comprising:

a main unit including operation switches; and an operation panel having operation buttons by which a user presses said operation switches, said operation panel being rotatably mounted on said main unit; wherein said portable electronic device is connectable with the video game device via a connector exposed when said operation panel is in an open position thereof, and said operation panel is freely attachable to and detachable from said main unit so as to be replaced with another operation panel is desired.

2. The portable electronic devices as described in claim 1, wherein multiple types of operation panels having operation buttons can be arbitrarily selected and replaced.

3. The portable electronic device as described in claim 2, wherein said multiple types of operation panels have operation buttons of different shape.

4. An operation panel for a portable electronic device in which the operation panel is rotatably mounted on a main unit of the portable electronic device used as an ancillary machine for a video game device and including said main unit having operation switches, the operation panel comprising:

operation buttons that press said operation switches, wherein said operation panel is freely attachable to and detachable from said main unit so as to be replaceable with another operation panel if needed; and said portable electronic device is connectable with the video game device via a connecter exposed when the operation panel is in an open state thereof.

5. The operation panel as described in claim 4, wherein said operation buttons have different shapes to correspond to modes of use thereof.

6. An operation method of a portable electronic device that is used as an ancillary machine for a video game and includes a main unit having operation switches and an operation panel having operation buttons to press said operation switches, said operation panel freely rotating on said main unit and being detachably mounted on said main unit, the operation method comprising the steps of:

holding said operation panel in an open state thereof when said operation panel is connected with said video game machine;

arbitrarily selecting multiple types of operation panels to mount a selected operation panel on said main unit; and pressing the operation switches of said main unit via the operation buttons of said selected operation panel.

7. A portable device used as an ancillary machine for a video game device and comprising:

a main unit including operation switches;

an operation panel having operation buttons by which a user presses said operation switches; and mounting means for rotatably mounting said operation panel on said main unit between an open position and a closed position; wherein said operation panel is connectable with said video game machine via a connector exposed when said operation panel is in the open position thereof; and said mounting means is configured to freely attach said operation panel to and detach said operating panel from said main unit to enable replacement of said operation panel with another operation panel if needed.

* * * * *